Dec. 8, 1931. C. E. REED 1,835,523
EARTH BORING DRILL
Filed Aug. 17, 1929
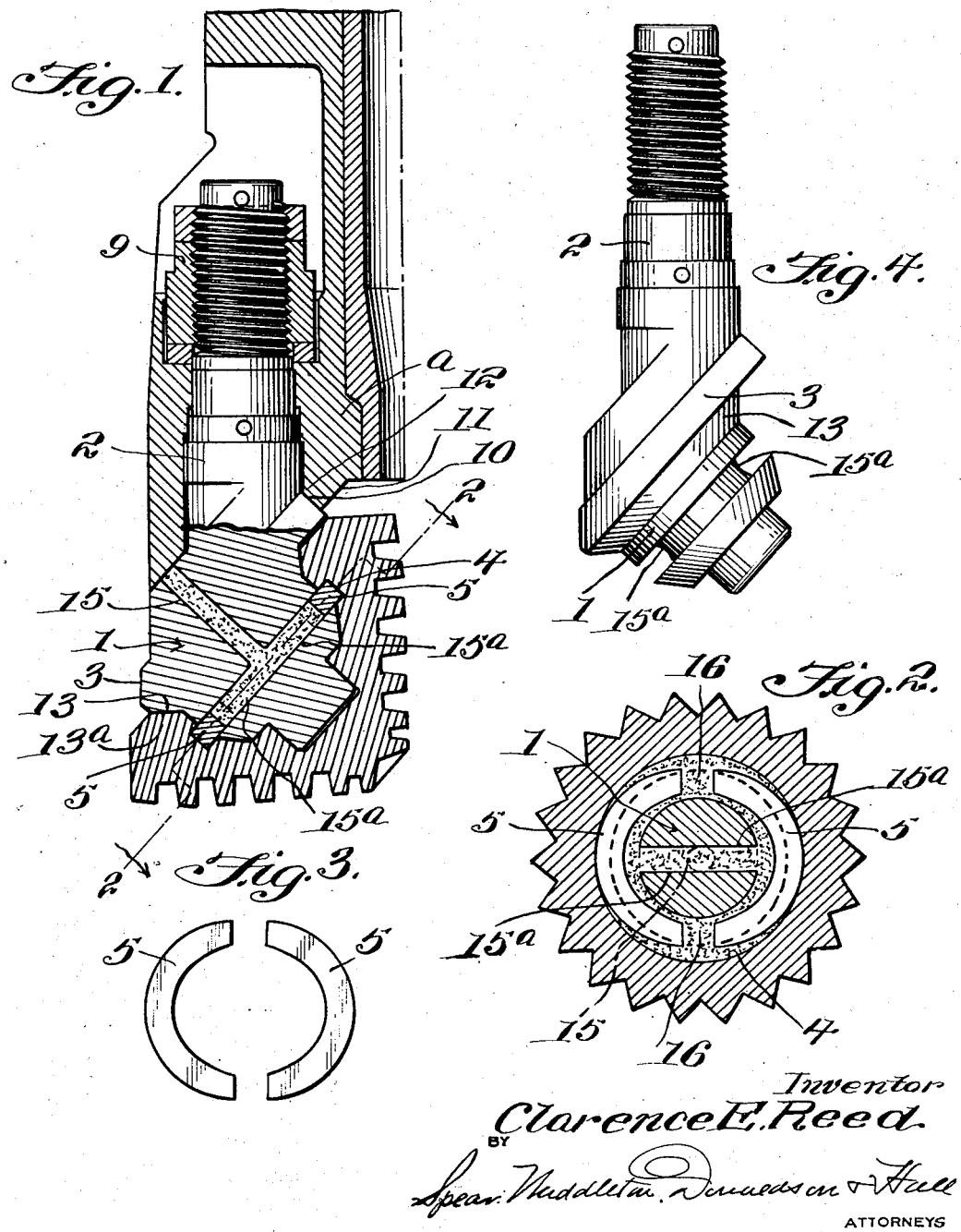
Inventor
Clarence E. Reed
BY
Spear, Middleton, Donaldson & Hull
ATTORNEYS Patented Dec. 8, 1931

1,835,523

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW YORK

EARTH BORING DRILL

Application filed August 17, 1929. Serial No. 386,681.

My invention relates to roller cutter units of the general form shown in Letters Patent of the United States granted to me November 20, 1928, #1,692,793, and concerns an improvement in the one piece spindle and shank and also in the means for locking the roller cutter on the spindle.

The invention is disclosed in the accompanying drawings in which:

Figure 1 is a sectional view of one form of the invention.

Fig. 2 is a cross sectional view of the invention substantially on line 2—2 of Fig. 1.

Fig. 3 is a view of the ring segments.

Fig. 4 is a side view of the roller cutter bearing unit alone.

In carrying out my invention in one form, I employ an integral spindle and shank at an angle to each other with an intermediate base plate or flange like in said Letters Patent mentioned above, said parts being marked herein respectively 1, 2, and 3.

The unit is held in the bit head by any suitable locking means such as the nut indicated at 9. The base plate or flange 3 fits in a seat recess 10 formed in the inclined wall 11 of the bit head. Thrust from the bottom of the hole transmitted through the roller to the spindle is taken in large measure by the base plate 3 and the wall 12 defining the seat recess. In order to strengthen the spindle, I provide the spindle with a flaring base portion 13 where it integrally connects with the flange or base plate 3. The lower surface of this flaring portion is substantially parallel with the bottom of the hole.

The roller cutter is provided with an internal flaring bore fitted to the flaring surface 13 so that the thrust of the roller cutter perpendicular to the plane of the said lower surface is directly taken by this surface, and this thrust is transmitted through the spindle, base plate, and seat recess walls into the bit head.

The assembly is made while the unit is disconnected from the bit head and the relation of the parts is such that when the shank 2 is inserted into the vertical socket of the bit head and the inclined base plate is resting in the seat recess, the spindle projecting as it does at right angles to the base plate, will extend at a downward inclination toward the vertical axis of the bit head, a part of which is indicated at $a$.

In placing the roller cutter in position, it is moved axially along the spindle until its flaring interior bearing surface contacts with the flaring bearing surface 13 at the base of the spindle. This bearing surface 13 therefore performs the function, addition to those mentioned above, of acting as a stop to accurately position the roller cutter relative to the annular groove and to locate the base of the roller cutter slightly out of contact with the face of the base plate so that the surfaces in bearing contact will be those between the roller cutter and the spindle.

In Figure 3 I show the means of locking the roller cutter rotatively on the spindle.

The ring segments 5 are first seated in the annular groove of the spindle, said groove being deep enough to receive said segments so that they will not initially project beyond the bearing face of the spindle. The roller cutter in this instance has an internal annular groove 4, which when the roller cutter is in place registers with the groove in the spindle containing the ring segments. After the roller cutter is properly positioned on the spindle the ring segments are pressed outwardly so as to lie in part in the groove of the roller cutter and in part in the groove of the spindle to thus lock the roller cutter against axial displacement while allowing it to rotate.

In this form of the invention, the spindle is provided with the flaring bearing surface at 13 and the roller cutter has its bore flared at 13$a$ to fit this flaring bearing surface and when these surfaces are in contact the groove in the roller will be accurately registered with the groove in the spindle so that the locking segments can be projected to lie across the joint between the bearing surfaces of the spindle and roller cutter.

For pressing and holding the ring segments outwardly to lock the roller cutter rotatively on the spindle, I may insert under pressure of a gun plastic material such as plastic wood. This is forced through an opening 15 leading through the spindle from the back of the unit to the groove in which the ring segments are located, suitable radiating conduits 15a being provided, so that these segments will be pressed outwardly into the groove of the roller cutter.

This plastic wood is like soft putty, but when dry is hard. The plastic material, preferably wood, will make a complete ring within the groove of the spindle and on the inner side of the ring segments and it will fill the space between the ends of the segments and enclose these ends as shown in Fig. 2 at 16.

By rotating the roller cutter relative to the spindle before the plastic material takes its final set, the composition ring of steel segments and plastic material will be freed so as to float in the groove of the spindle as the roller is rotated during work, giving all the advantages of the floating segments in the patent above mentioned.

It will be noted that where the filling material is employed for holding the segments in locking position, a roller cutter unit is provided in which the elements thereof are non-adjustable and are held inseparably together, making it necessary to discard the whole unit when it becomes worn.

Instead of the plastic filling as a means for forcing the segments outwardly, they may be spring pressed as in my application #370,087.

The general form of the seat recess in the bit head and the flange or base plate of the roller bearing unit which fits therein is shown in Letters Patent of the United States No. 1,636,666 granted to me July 19, 1927.

I claim:

1. A one-piece bearing element for a roller cutter of earth boring drills comprising a spindle, a shank extending at an angle to the spindle, and adapted for insertion into a socket in a bit head a base plate or flange between the spindle and shank and integral with both, said spindle having an annular groove in its surface, and having also a flared portion integral therewith and with the base and spaced from the edge of said groove, substantially as described.

2. In combination in an earth boring drill, a spindle having a recess in its bearing surface, a roller cutter having a bore with a seat recess therein, an element adapted to initially lie in the spindle recess and to be projected radially outward to lie partly in said spindle recess and partly in said seat recess of the cutter, and material initially plastic inserted through the recess of the spindle for forcing said element radially outward to lie across the joint between the spindle and cutter and rotatively lock the roller cutter on the spindle, substantially as described.

3. In combination in an earth boring drill, a spindle having a recess in its bearing surface, a roller cutter having a bore with a seat recess therein, an element adapted to initially lie in the spindle recess and to be projected radially outward to lie partly in said spindle recess and partly in said seat recess of the cutter, and filling material inserted through the recess of the spindle for forcing said element radially outward to lie across the joint between the spindle and cutter and rotatively lock the roller cutter on the spindle, substantially as described.

4. In combination in an earth boring drill, a head, and a roller cutter unit comprising a spindle, a roller cutter, locking means extending across the joint between the spindle and roller cutter, said spindle having a substantially radial conduit leading to the locking means and an opening leading to the conduit from the back of the unit, filling material in said opening and conduit for holding the locking means in position, and means for holding the unit to the head with a wall of the head closing said opening, substantially as described.

5. In combination in an earth boring drill, a spindle having a recess intermediate of its bearing surface, a roller cutter having a complementary recess, locking means preformed for location in the recesses and adapted to hold the roller on the spindle against axial displacement while allowing its free rotation, said locking means occupying only a part of said recesses and filling material filling the parts of the recesses not occupied by the locking means to hold the latter in position and exclude abrasive from bearing surfaces between the cutter and the spindle, said spindle having a passage through which the filling material is introduced into the recesses, said filling material forcing the locking means radially outward to lie across the joint between the spindle and the roller cutter, substantially as described.

6. In combination, a one piece bearing element comprising a spindle, shank and base plate all in one piece and with the shank at an angle to the spindle and with the base lying in a plane at right angles to the axis of the spindle, said spindle having a groove extending circumferentially about the same, locking means in the groove and projecting therefrom, and a roller cutter having a seat recess to receive the locking means, said spindle and base having between them a conical bearing portion integral with both, said roller cutter having an integral portion at its base of conical form to bear on the conical bearing of the spindle, said integral portion of the roller cutter reaching inwardly back of the locking means and defining the seat recess at this point, substantially as described.

In testimony whereof, I affix my signature.

CLARENCE E. REED.